United States Patent [19]

Hehl

[11] Patent Number: 4,536,144
[45] Date of Patent: Aug. 20, 1985

[54] REVERSING MECHANISM FOR SAFETY GATE OF INJECTION MOLDING MACHINE

[76] Inventor: Karl Hehl, Arthur-Hehl-Strasse 32, 7298 Lossburg 1, Fed. Rep. of Germany

[21] Appl. No.: 533,456

[22] Filed: Sep. 19, 1983

[30] Foreign Application Priority Data

Sep. 17, 1982 [DE] Fed. Rep. of Germany ....... 3234453

[51] Int. Cl.³ ................................................ B29F 1/00
[52] U.S. Cl. ..................................... 425/154; 425/136
[58] Field of Search ............................... 425/151–154, 425/135, 136; 16/277

[56] References Cited

U.S. PATENT DOCUMENTS 2,948,015  8/1960  Hansen ................................... 16/277
4,382,763  5/1983  Hehl ...................................... 425/153
4,382,764  5/1983  Hehl ...................................... 425/153

Primary Examiner—J. Howard Flint, Jr.

[57] ABSTRACT

A drive-reversing safety mechanism for the motor-driven safety gate of an injection molding machine, featuring a channel-shaped contact bar which is pivotably attached to the outer vertical corner on the leading edge of the safety gate and biased forwardly, so as to pivot rearwardly, when encountering an obstacle while closing. A minimal initial displacement of the contact bar produces the depression of a transversely oriented plunger of a reversing switch with the aid of a flexible, bell-crank-type actuating lever in the shape of an open triangle. A curved end flange of the contact bar drives the actuating lever with a trigger edge, overriding the initial switching displacement, while holding the switch plunger in a depressed position.

9 Claims, 5 Drawing Figures

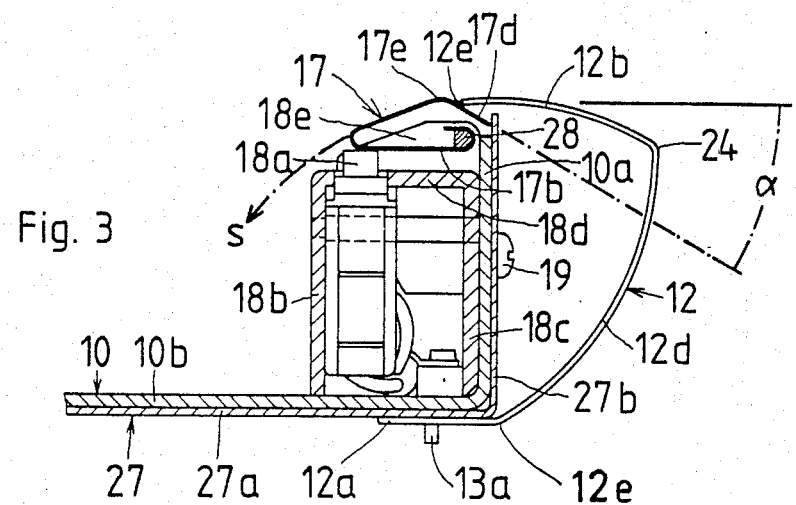
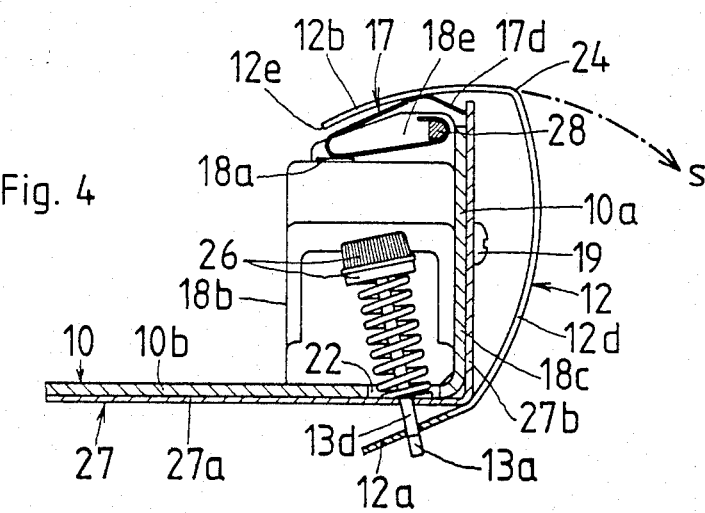
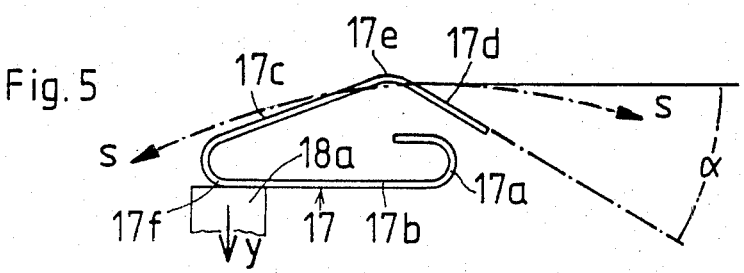

4,536,144

REVERSING MECHANISM FOR SAFETY GATE OF INJECTION MOLDING MACHINE

BACKGROUND OF THE INVENTION

1. Field of the Invention

The present invention relates to injection molding machines and, more particularly, to a mechanically openable and closable safety gate for the die closing unit of an injection molding machine which has a drive-reversing safety mechanism with a pivotable contact member on its leading edge for the protection of the machine operator.

2. Description of the Prior Art

Industrial safety codes require that all injection molding machines have safety covers or safety gates which prevent access to the clamping space of the injection molding die, when the machine is in operation. The use of a mechanically closable safety gate brings with it the additional requirement of protecting the operator or mechanic against injury, when the cover is executing its closing movement.

U.S. Pat. No. 4,382,764 discloses such a drive-reversing mechanism for the motor-driven safety gate of an injection molding machine, the rectangular safety gate carrying a contact ledge pivotably attached to its leading edge. The pivot connection is formed by an interior fold corner of the channel-shaped contact ledge engaging an exterior corner of smaller angle at the junction of the main panel and the front side flange of the safety gate, a corner-adjoining positioning flange of the contact ledge being yieldingly clamped to the main panel of the safety gate by means of holding pins and compression springs.

An end flange of the contact ledge, reaching behind the free edge of the safety gate side flange, carries a switch-actuating member which moves perpendicularly against the contact plunger of an electrical switch, when the contact ledge is pivoted rearwardly, as the result of encountering an obstacle in its closing path. During the resultant rearward movement of the actuating member, a cam portion on the leading edge of the actuator member produces a depression of the switch plunger, the remaining flat portion of the actuating member maintaining the switch plunger in the depressed state, as the contact ledge and its actuating member continue their rearward movement.

The axis of the switch plunger being parallel to the pivot axis of the contact ledge, this mechanism requires a precise positioning of the contact ledge in relation to the safety gate along the pivot axis, as any shifting of the contact ledge along this line will affect the interaction between the actuating member and the switch plunger in terms of changing the level to which the latter is depressed.

SUMMARY OF THE INVENTION

Is is a primary objective of the present invention to suggest an improvement over the prior art safety mechanism disclosed in my U.S. Pat. No. 4,382,764, the improved safety mechanism being easier to assemble and adjust and designed to produce a depression of the switch plunger with a smaller initial displacement of the pivotable contact member.

The present invention proposes to attain this objective by suggesting an improved drive-reversing mechanism for the mechanically closable safety gate of a production machine, such as, for example, an injection molding machine, featuring a pivotable, forwardly biased contact bar on the leading edge of the safety gate, similar to the contact ledge of U.S. Pat. No. 4,382,764, but where the electrical switch has its switch plunger oriented perpendicularly to the pivot axis of the contact bar and the latter has a curved wall portion in the form of a sector of a cylinder, with a leading trigger edge moving rearwardly, when the contact bar is pivoted rearwardly.

Between this trigger edge of the contact bar and the switch plunger is arranged a bell-crank-type actuating lever of which one extremity engages the switch plunger and the other extremity forms a shallow overlap with the arcuate path of the curved wall portion and trigger edge of the contact bar. The pivot axis of the actuating lever is parallel to the pivot axis of the contact bar and so arranged in relation to the two extremities of the lever that a small initial displacement of the lever by the trigger edge of the contact bar produces a depression of the switch plunger. The depressed position of the actuating lever is maintained by the curved surface of the contact bar, as the contact bar continues its rearward pivoting movement.

In a preferred embodiment of the invention, the actuating lever is a leaf spring bent into the shape of an open triangle, the lever extremity cooperating with the trigger edge of the contact bar being arranged to flex away from the trigger edge path and towards the actuating lever pivot axis. The spring action of the leaf spring is so coordinated with the return spring of the switch plunger that the plunger is depressed against a stop, before the actuating lever undergoes substantial deformation, with the result that the smallest-possible initial displacement of the lever by the trigger edge of the contact bar produces the motion-reversing depression of the switch plunger.

By way of a further improvement, the invention suggests that the pivot support for the flexible actuating lever be arranged at the housing of the reversing switch, the leaf spring forming an open loop engaging integral pivot noses of two upstanding wall portions of the switch housing. These wall portions also serve to laterally position the actuating lever.

The proposed novel safety mechanism is of very simple design, being very economical in terms of manufacturing costs and very easy to assemble. No adjustments are necessary, and the actuation of the reversing switch is quick and reliable and not influenced by any shifting of the contact bar relative to the safety gate along the contact bar pivot axis.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 3 shows a horizontal cross section through the safety gate of FIGS. 1 and 2, taken at the level of the reversing switch, with the contact bar in its rest position;

FIG. 4 is similar to FIG. 3, showing the contact bar in a rearwardly pivoted position; and FIG. 5 shows the actuating lever of FIGS. 3 and 4 at a further enlarged scale.

DESCRIPTION OF THE PREFERRED EMBODIMENT

Figure 1:
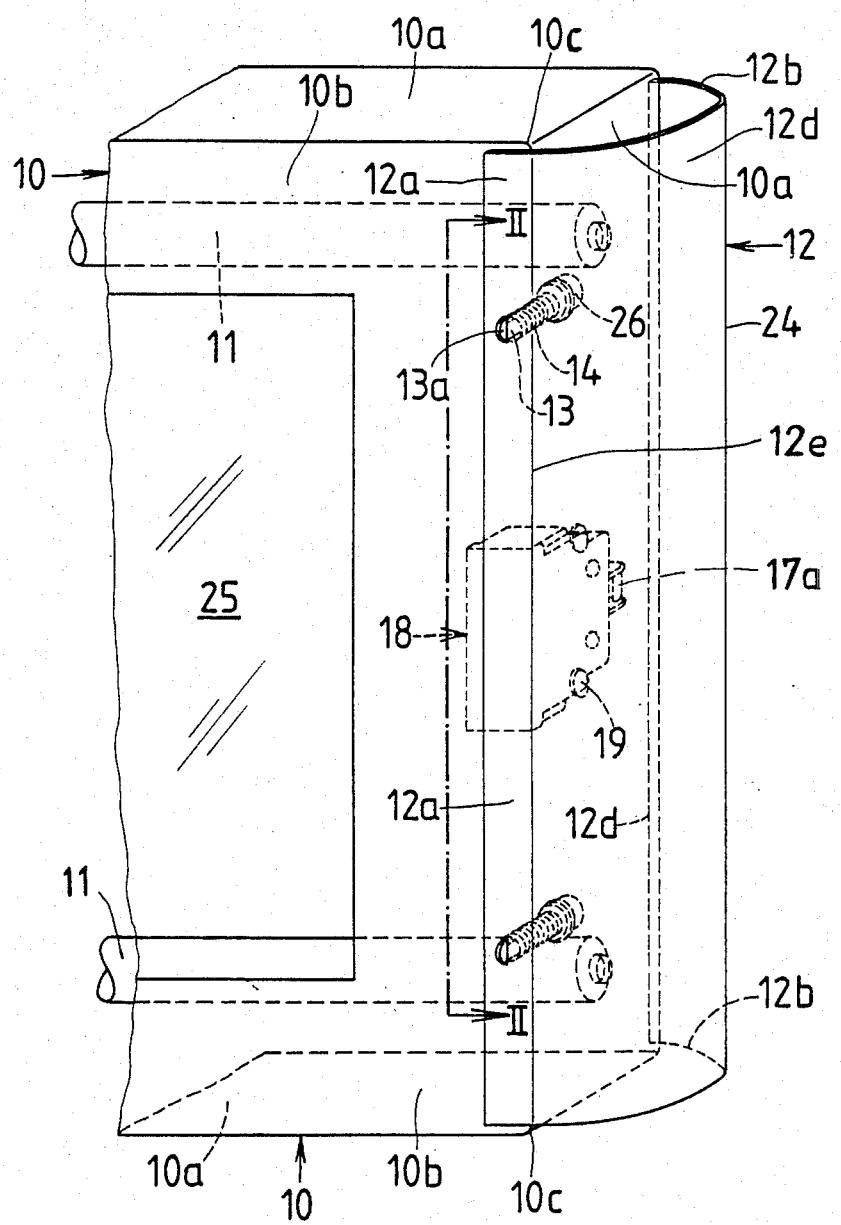
FIG. 1 shows, in a perspective representation, the leading portion of a safety gate carrying a pivotable contact bar, a drive-reversing switch and an actuating lever operated by the contact bar, as part of an embodiment of the present invention.

FIG. 1 of the drawing shows the forward portion of a safety gate 10 of an injection molding machine. It may be one of three safety gates on the die closing unit of the machine, covering the die clamping space, when the machine is in operation. The three safety gates are openable and closable by means of a mechanical drive, using an electric motor and an endless roller chain, for example, each safety gate having preferably its own drive unit.

The safety gate 10 is guided in its opening and closing movements on two horizontal guide rods 11 reaching through guide bores of a stationary, portal-shaped supporting frame. The guide rods 11 are bolted to the vertical transversely oriented side flanges 10a, at the front and rear of the safety gate 10. A safety gate arrangement of this kind is shown in U.S. Pat. No. 4,382,763.

The safety gate 10 is a generally rectangular body, preferably deep-drawn of sheet metal. Its longitudinal vertical main panel 10b is adjoined by two horizontal and two vertical side flanges 10a. In the front safety gate which is shown in FIG. 1, the main panel 10b is additionally fitted with a window 25. FIG. 1 shows only the right-hand portion of the safety gate 10, which is the leading side of the safety gate in the closing movement.

On the leading edge of the safety gate is arranged a vertical contact bar 12 in the general shape of a sheet metal channel. The safety bar 12 is supported on, and pivotably attached to, the vertical outer front corner 10c of the safety gate 10 by means of two spring pin assemblies, which can be seen in FIGS. 2 and 4. The spring pins 13 pull a positioning flange 12a of the contact bar 12 against the forward edge portion of the vertical main panel 10b of the safety gate, thereby creating an open hinge connection between the right-angle front corner 12c of the safety gate and the obtusely angled interior corner 12e of the contact bar 12.

Figure 2:
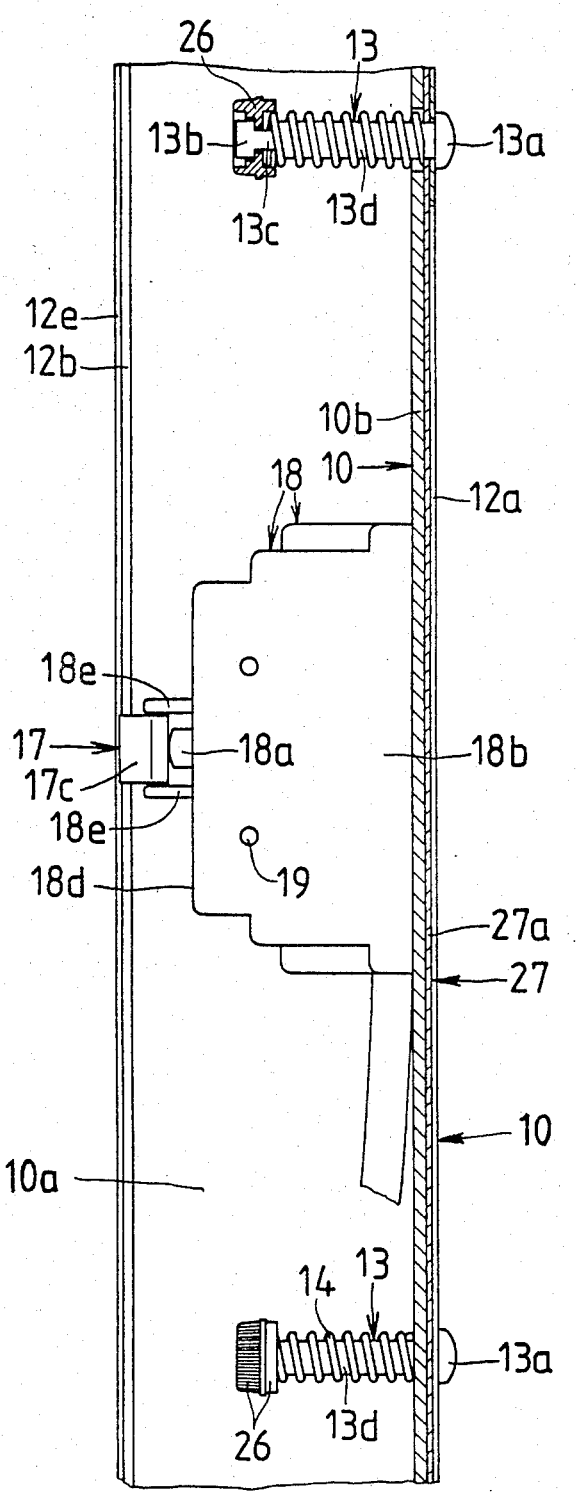
FIG. 2 shows, at an enlarged scale, a transverse cross section through the safety gate of FIG. 1, taken along line II—II thereof.

As can best be seen in the upper part of FIG. 2, the two spring pin assemblies consist of a spring pin 13 in the form of a flat, die-cut part which has an outer pin head 13a adjoining a narrower central shaft portion 13d and an inner pin head 13b of the same width as the shaft portion 13d which is separated from the latter by a neck portion 13c. The positioning flange 12a of the contact bar 12 and the main panel 10b of the safety gate have rectangular holes matching the cross section of the shaft portions 13d.

Following the insertion of a spring pin 13 through one of these rectangular holes from the outside, a compression spring 14 is inserted over its inwardly protruding shaft portion 13d and held in place under a compressive preload by a lock cap 26. A 90°-rotation of the lock cap 26 secures the latter against the inner pin head 13a. In operation, this open-hinge connection is comparable to a hinge connection which is disclosed in the earlier-mentioned U.S. Pat. No. 4,382,764.

The cross-sectional profile of the contact bar 12 is such that, in the rest position of the contact bar, in which its positioning flange 12a is engaged against the safety gate front panel 10b, the center portion 12d of the contact bar 12 extends forwardly and inwardly from the side flange 10a to a leading contact edge 24. The center portion of the contact bar 12 is curved outwardly, thereby reducing the angle at the contact point 24.

An end flange 12b completes the cross-sectional profile of the contact bar 12. As can be seen in FIGS. 3 and 4, the end flange 12b forms a sector of a cylinder about the pivot axis of the contact bar 12 at the safety gate corner 10c. The curved end flange 12b has a rearwardly pointing leading trigger edge 12e which, when the contact bar 12 is pivoted rearwardly by an obstacle in the closing path of the safety gate, moves rearwardly along an arcuate path s-s. The curvature of the end flange 12b coincides with this path.

In the rest position of the contact bar 12, its trigger edge 12e is located a short distance behind the inner edge of the vertical side flange 10b of the safety gate 10, the curved end flange 12b clearing the inner edge of the side flange 10b by a small amount. The center portion 12d and the end flange 12b of the contact bar 12 are preferably formed with the same convex curvature.

On the inside of the safety gate 10, behind its vertical side flange 10a, is arranged an electrical switch, preferably of the motor-reversing type. The switch 18 has a generally block-shaped housing with side walls 18b and 18c and an open bottom wall abutting against the safety gate main panel 10b. The switch 18 is attached to the the inner side of the safety gate side flange 10a by means of two screws 19 which engage threaded bores in the housing side wall 18c.

Protruding rearwardly from the top side of the switch is a switch plunger 18a which is movable horizontally in a direction which is perpendicular to the safety gate main panel 10b. The normal position of the switch plunger 18a is the extended position of FIGS. 2 and 3. A depression of the plunger 18a in the direction y (FIG. 5) to the position shown in FIG. 4 actuates the reversing switch. A plunger return spring (not shown) applies a return force to the switch plunger 18a in the direction of its extended normal position.

The housing of the switch 18 also carries an actuating lever 17 which is pivotable about a vertical pivot axis located on the inwardly facing top side of the switch 18 and just behind the vertical side flange 10a of the safety gate 10. The actuating lever 17 is formed by a leaf spring which is bent into the shape of a generally triangular bell crank, as can best be seen in FIG. 5.

An open loop 17a formed on one end portion of the leaf spring engages two oppositely aligned pivot noses 28 (FIG. 4) on two upstanding wall portions 18e on the top side of the switch housing. As can be seen in FIG. 2, the housing wall portions 18e also position the actuating lever in the lateral, i.e. the vertical, sense.

The shape of the open pivot loop 17a of the actuating lever 17 consists of a semi-circle flanked by two parallel length portions, and the cooperating pivot noses 28 on the switch housing have a matching cross section composed of a semi-circle and an adjoining semi-square of identical diameter. This makes it possible to install the actuating lever 17 by simply inserting its pivot loop 17a laterally over the pivot noses 28, prior to attaching the switch assembly to the safety gate 10.

A certain detent action between the pivot loop 17a and the two pivot nose corners serves to yieldingly maintain the actuating lever in its normal rest position (FIGS. 3 and 5). A closely adjacent wall portion of the safety gate prevents the accidental release of the actuating lever 17 from the pivot noses 28.

The bell-crank-type actuating lever 17 has a first leg portion 17b extending substantially parallel to the safety gate main panel 10a and rearwardly from the pivot loop 17a to a first lever extremity 17f in contact with the tip of the switch plunger 18a. A second leg portion 17c extends forwardly and inwardly from the first lever extremity 17f to a second lever extremity 17e, and a third leg portion 17d continues forwardly and outwardly from the second leg portion 17c, forming an obtusely angled knee at the second lever extremity 17e. This third leg portion 17d, while extending in the general direction of the pivot loop 17a of the actuating lever 17, is not connected to the latter.

As can be seen in FIG. 3, which shows the actuating lever 17 and the contact bar 12 in their normal rest positions, the knee-shaped second lever extremity 17e overlaps the arcuate path s-s of the trigger edge 12e by a small radial depth, and the third leg portion 17d of the actuating lever 17 forms an inclined cam face or ramp for the trigger edge 12e of the contact bar 12 (see also FIG. 5). Additionally, the pivot axis of the actuating lever 17 is located forward of the point of contact between the trigger edge 12e and the third leg portion 17d, so that a line connecting the two points forms an acute angle with a tangent to the trigger edge path s-s at the trigger edge 12e.

FIGS. 3–5 show that the bell-crank-type actuating lever 17 produces a movement magnification, as a result of the much greater radius of the first extremity 17f from the pivot axis of lever 17, compared to the radius of the second extremity 17e. An even greater magnification of angular movement is achieved in the interaction between the contact bar 12 and the actuating lever 17, at the point of driving contact between the trigger edge 12e of the former and the second extremity 17e of the latter. This initial movement magnification is due to the fact that the pivoting radius of the driving trigger edge 12e of the contact bar 12 is a multiple of the pivoting radius of the second extremity 17e of the actuating lever 17.

While it is an advantageous feature of the mechanism of the present invention to obtain a switch actuation with a minimum of initial movement on the contact bar 12, the mechanism must also allow for the contact bar 12 to execute a full pivoting movement into abutment against the vertical side flange of the safety gate 10, not only in order to cushion the impact of the safety gate against an obstacle encountered in its path, but also to allow for an inevitable amount of reaction time of the reversing mechanism and a corresponding continuation of the safety gate advance. This additional advance prior to movement reversal of the safety gate could otherwise cause injury to an operator's hand, should the safety gate 10 execute a closing movement, while his fingers rest on the stationary frame part against which the safety gate would come to a stop, when closed.

In order to accomplish these features, it is necessary for the contact bar 12 to firstly produce a switch actuation with a minimum of contact bar displacement and to secondly be able to override the point of switch actuation, while maintaining the reversing switch in the actuated state.

An almost immediate response in terms of switch actuation is achieved through the double magnification of the angular movement of the contact bar 12 in relation to the switch plunger 18a. This response can be further sharpened to a "hair trigger" response, if desired, by adjusting the leaf spring of the actuating lever in such a way that a preload condition exists at the point of driving contact between the trigger edge 12e and the actuating lever 17 and at the point of contact between lever 17 and the switch plunger 18a.

The "override" feature is achieved by virtue of the fact that the second extremity 17d of the actuating lever 17 can move out of the path s-s of the trigger edge 12e of the contact bar 12. An initial portion of this escape movement is the result of the angular displacement of the lever which is necessary to depress the switch plunger 18a, and the balance of the escape movement is the result of a deformation of the leaf spring.

By arranging for the leaf spring to be substantially more resistant to deflection than the plunger return spring is to compression, a movement of the trigger edge 12e against the actuating lever 17 will first produce a depression of the switch plunger 18a, for the desired immediate switching response. Then, after the movement of the first lever extremity 17f is stopped by an abutment—which may be arranged to work through the switch plunger 18a, or may be in the form of an independent stop on the switch housing—the continued advance of the trigger edge 12e against the inclined third leg portion 17d causes the leaf spring to be deflected out of the trigger edge path s-s.

Finally, the requirement that the switch plunger 18a be maintained in its depressed position, until the contact bar 12 is fully extended and returned to its rest position, is met by the fact that the end flange 12b of the contact bar has the same curvature as the trigger edge path s-s. It follows that in all positions of rearward displacement of the contact bar 12, the inner surface of its end flange 12b bears against the knee-shaped extremity 17e of the deflected actuating lever 17.

It should be understood, however, that the flexibility of the actuating lever 17, as described above in connection with its preferred embodiment as a leaf spring in the shape of an open triangle, is not a prerequisite for the mechanism of the present invention. A rigid bell-crank-type actuating lever can be used, for example, if the depth of its overlap with the trigger edge path s-s is reduced to correspond to the angular movement of the actuating lever which is required to depress the switch plunger.

The small angle α with which the trigger edge 12e of the contact bar 12 attacks the inclined leg portion 17d of the actuating lever 17 assures a smooth and rebound-free driving engagement between the two parts. Additionally, the knee-shaped second lever extremity 17e is rounded, so that the angle of attack decreases, as the trigger edge 12e slides towards the crest of the "knee".

The leading edge of the safety gate 10 and its pivot corner 10c are reinforced by means of a vertical angle 27 which is engaged against the inner sides of the main panel 10b and of the vertical side flange 10a, as can be seen in FIGS. 3 and 4. The leg portions 27a and 27b of the angle 27 are much heavier than the sheet metal gauge of the deep-drawn safety gate frame. The transverse leg portion 27b of the angle 27 is set back from the inner vertical edge of the safety gate side flange 10a, but reaches to the level of the pivot loop 17a of the actuating lever 17, thereby securing the latter on the pivot noses 28. The position of the actuating lever 17 is additionally secured by the fact that its inclined leg portion 17d reaches into contact, or near-contact, with the side flange 10a.

It should be understood, of course, that the foregoing disclosure describes only a preferred embodiment of the invention and that it is intended to cover all changes and modifications of this example of the invention which fall within the scope of the appended claims.

I claim the following:

1. A safety gate control mechanism for a production machine having a safety gate which is movable between open and closed positions by means of a safety gate drive with a drive control circuit, which control mechanism interrupts a closing movement of the safety gate, when the safety gate encounters an object or obstacle in its closing path, said safety gate control mechanism comprising in combination:

a straight leading edge on the safety gate extending transversely to the path of the closing movement of the safety gate;

a pivotable straight contact bar extending parallel to and ahead of said leading edge of the safety gate, the contact bar being attached to the safety gate by means of a pivot connection defining a contact bar pivot axis which is likewise parallel to the leading edge of the safety gate;

means for biasing the pivotable contact bar forwardly away from the leading edge of the safety gate into a rest position from which an obstacle in the path of the closing safety gate causes the contact bar to pivot rearwardly towards said leading edge, in opposition to said contact bar biasing means; and switching means in the drive control circuit of the safety gate drive for interrupting the closing movement of the safety gate, in response to a rearward pivoting movement of the contact bar; and wherein:

the pivotable contact bar includes a wall portion with a curved surface corresponding substantially to a sector of a cylinder around the contact bar pivot axis, said curved surface having a rearwardly pointing extremity defining a trigger edge;

the switching means includes an electrical switch with a depressible switch plunger, the switch being mounted on the safety gate, behind its leading edge, and so oriented that the axis of the switch plunger is perpendicular to the contact bar pivot axis; and the switching means further includes an actuating lever which is pivotably supported by the safety gate on a pivot axis which is parallel to the contact bar pivot axis and located between the contact bar pivot axis and the trigger edge of the contact bar in rest position, the actuating lever being movable between a rest position and a pivoted position and having a first extremity cooperating with the switch plunger to depress the latter, when the actuating lever is pivoted out of its rest position, and a second extremity which, in the rest positions of the actuating lever and of the contact bar, extends into the the path of said trigger edge of the contact bar in the immediate vicinity of said trigger edge, overlapping its pivoting path by such a radial depth that, when the contact bar is pivoted rearwardly, its trigger edge cooperates with the second extremity of the actuating lever to pivot the actuating lever and to thereby depress the switch plunger.

2. mechanism as defined in claim 1, wherein the location of the actuating lever pivot axis in relation to the trigger edge of the contact bar and the depth of radial overlap between the second extremity of the actuating lever and the trigger edge path are so arranged that a relatively small initial pivoting movement of the contact bar produces a pivoting displacement of the actuating lever which moves the second extremity of the actuating lever out of the trigger edge path, while the first extremity of the actuating lever depresses the switch plunger, so that, during a further pivoting movement of the contact bar, no additional pivoting displacement is imparted to the actuating lever and the latter is prevented from returning to its rest position by the curved surface of the contact bar occupying the trigger edge path.

3. A mechanism as defined in claim 2, wherein the location of the actuating lever pivot axis is such that a line linking this location with the point of initial contact between the trigger edge of the contact bar and the second extremity of the actuating lever forms an acute angle with a tangent to the trigger edge path at said point of initial contact.

4. A mechanism as defined in claim 2, wherein the actuating lever is a resiliently deformable member, deformation of the actuating lever having the effect of displacing the second extremity of the actuating lever in relation to the first extremity of the actuating lever;

the switch plunger is biased against depression by means of a return spring and in its fully depressed position, serves as an abutment stop for the first extremity of the actuating lever;

the moment exerted on the actuating lever by the return spring during plunger depression is less than the moment with which the actuating lever resists deformation, as the second extremity of the actuating lever is moved out of the trigger edge path by said trigger edge; and the actuating lever is so arranged that the angular displacement of the first extremity of the actuating lever required for the full depression of the switch plunger is smaller than the angular displacement required for the second extremity of the actuating lever to move out of the trigger edge path, so that a rearward movement of the contact bar to the point where the second extremity of the actuating lever is moved out of the trigger edge path produces an abutment of the actuating lever against the fully depressed switch plunger and a deformation of the actuating lever.

5. A mechanism as defined in claim 1, wherein the safety gate has a longitudinal main panel oriented in the direction of the safety gate movement and a transversely oriented side flange with a proximate edge adjoining the main panel at a corner which is parallel and proximate to the pivot axis of the contact bar, the side flange having a distal edge which is substantially parallel to its proximate edge;

the contact bar has an angular cross-sectional profile formed by a center portion which extends away from its pivot axis and transversely across the width of the side flange of the safety gate, at a distance ahead of the latter, and an end flange which adjoins the center portion at an angle, extending rearwardly therefrom, outside of and past the distal edge of the safety gate side flange, the end flange thereby forming said curved-surface wall portion with a trigger edge at the rear extremity of the end flange;

the electrical switch is arranged behind the safety gate side flange, its switch plunger being oriented substantially parallel to the side flange and depressible in the direction towards the safety gate main panel; and the pivotable actuating lever is of the bell-crank-type, having its pivot axis located behind the side flange of the safety gate and ahead of the free end of the switch plunger.

6. A mechanism as defined in claim 5, wherein the actuating lever pivot axis is located closer to the contact bar pivot axis than the contact bar trigger edge, the difference between the two distances being a fraction of the distance between the two pivot axes; and the lever arm of the switch plunger on the first extremity of the actuating lever is considerably greater than the lever arm of the contact bar trigger edge on the second extremity of the actuating lever.

7. A mechanism as defined in claim 5, wherein the bell-crank-type actuating lever is formed by a leaf spring being folded into a generally triangular shape and defined by a first leg portion extending from the pivot axis to the first extremity of the actuating lever, in a direction substantially perpendicular to the axis of the switch plunger, a second leg portion adjoining the first leg portion at said first extremity and extending from there to the second extremity of the actuating lever, in a direction forming a divergent acute angle with the first leg portion, and a third leg portion adjoining the second leg portion at said second extremity and extending from there in a direction forming an obtuse angle with the second leg portion and approaching the actuating lever pivot axis, said third leg portion having a free distal extremity which is movable, when the leaf spring is forcibly deflected, whereby the second extremity of the actuating lever is resiliently displaceable in a substantially radial direction relative to the actuating lever pivot axis;

the third leg portion of the leaf spring forms an acute angle with a tangent to the trigger edge path at the point of initial contact between the contact bar trigger edge and the actuating lever;

the switch plunger is biased against depression by means of a return spring and serves as an abutment stop for the first extremity of the actuating lever, in the fully depressed position of the switch plunger;

the moment exerted on the actuating lever by the return spring during plunger depression is less than the moment with which the actuating lever resists deformation, as its second extremity is moved out of the trigger edge path;

the second extremity and adjoining portions of the second and third leg portions of the actuating lever overlap the trigger edge pivoting path by a depth which is greater than is necessary to produce a full depression of the switch plunger, with the result that an initial rearward pivoting movement of the second extremity of the actuating lever produces a full depression of the switch plunger by the first extremity of the actuating lever, and further rearward advance of the trigger edge causes said second extremity of the actuating lever to be deflected radially toward the actuating lever pivot axis, until the second extremity of the actuating lever is moved out of the trigger edge path, and still further rearward advance of the contact bar and its trigger edge imparts no further movement to the actuating lever, the actuating lever being prevented from returning to its rest position by the curved surface of the contact bar occupying the trigger edge path and thereby maintaining the second extremity of the actuating lever in its deflected state.

8. A mechanism as defined in claim 7, wherein the electrical switch has a switch housing which is attached to the safety gate, behind the side flange of the safety gate, the switch housing having two spaced upstanding wall portions positioning the actuating lever therebetween, said wall portions carrying oppositely aligned pivot noses; and the leaf spring which forms the actuating lever forms a pivot loop at the actuating lever pivot axis, the pivot loop engaging the pivot noses of the switch housing to form the actuating lever pivot connection.

9. A mechanism as defined in claim 8, wherein the pivot loop of the actuating lever is a rearwardly open loop in the form of a semi-circle flanked by parallel length portions of which one is said first leg portion of the leaf spring;

said pivot noses are integral extensions of the switch housing, having a cross section composed of a semi-circle and an adjoining semi-square of identical diameter matching the spacing between said parallel length portions of the open pivot loop, so that the pivot loop of the actuating lever is insertable over the pivot noses; and the pivot noses are located in the immediate vicinity of a wall member of the safety gate, so that the insertion of the pivot loop over the pivot noses requires an orientation of the leaf spring which is approximately 90 degrees rotated from its operational orientation.

* * * * *